(12) United States Patent
Markendorf et al.

(10) Patent No.: US 6,667,798 B1
(45) Date of Patent: Dec. 23, 2003

(54) METHOD AND DEVICE FOR DETERMINING SPATIAL POSITIONS AND ORIENTATIONS

(75) Inventors: Albert Markendorf, Suhr (CH); Raimund Loser, Bad Säckingen (DE)

(73) Assignee: Leica Geosystems AG, Unterentfelden (CH)

( * ) Notice: Subject to any disclaimer, the term of this patent is extended or adjusted under 35 U.S.C. 154(b) by 0 days.

(21) Appl. No.: 10/048,304
(22) PCT Filed: Jul. 20, 2000
(86) PCT No.: PCT/CH00/00396
§ 371 (c)(1),
(2), (4) Date: Jun. 10, 2002
(87) PCT Pub. No.: WO01/09642
PCT Pub. Date: Feb. 8, 2001

(30) Foreign Application Priority Data

Jul. 28, 1999 (CH) .............................................. 1394/99

(51) Int. Cl.⁷ .............................................. G01B 11/26
(52) U.S. Cl. .................................. 356/139.03; 702/153
(58) Field of Search ........................ 356/139.03, 141.1, 356/152.3, 141.5, 141.2, 601, 612; 702/153, 167

(56) References Cited

U.S. PATENT DOCUMENTS

| | | | |
|---|---|---|---|
| 3,715,599 A | * | 2/1973 | Marcy |
| 4,707,129 A | | 11/1987 | Hashimoto et al. |
| 4,714,339 A | | 12/1987 | Lau et al. |
| 6,420,694 B1 | * | 7/2002 | Greenwood |

FOREIGN PATENT DOCUMENTS

| | | |
|---|---|---|
| DE | 295 229 A5 | 10/1991 |
| WO | WO 97/14015 | 4/1997 |

* cited by examiner

Primary Examiner—Stephen C. Buczinski
(74) Attorney, Agent, or Firm—Oppendahl & Larson LLP

(57) ABSTRACT

Using a laser-tracker (1) with an interferometer together with a retroreflector (3) in the form of a triple prism or a triple mirror arranged on an object and designed for parallel reflection of the laser beam (5) directed to the reflector (3), the position of the object is computed by way of measurement data with respect to the direction of the laser beam (5) and its path length. Additionally the spacial orientation of the object (2) is determined by producing additional measurement data with respect to the angle of incidence ($\alpha$) of the laser beam into the reflector (3) and/or with respect to an adjustable orientation of the reflector (3) relative to the object (2) and by computing the position and spacial orientation of the object (2) by way of measurement data with respect to the direction and the path length of the laser beam (5) and by way of this additional measurement data. Thereby the measurement data of the direction measurement and of the interferometric measurement may be corrected by way of the additional measurement data with respect to the angle of incidence ($\alpha$) such eliminating their dependency on the angle of incidence. For determining the angle of incidence ($\alpha$), the reflector (3) is designed in a manner such that a central part of the laser beam (5) passes through the reflector (3) unreflected and behind the reflector (3) impinges a position sensor (12) arranged stationarily relative to the reflector, while a peripheral part of the laser beam (5) is reflected parallel and used for the interferometric measurement.

18 Claims, 4 Drawing Sheets

METHOD AND DEVICE FOR DETERMINING SPATIAL POSITIONS AND ORIENTATIONS

The invention lies in the field of measuring technology and relates to a method and arrangement according to the corresponding, independent claims. The method and arrangement serve for determining the spacial position and the orientation of objects, in particular of moved or movable objects.

It is known to follow the spacial position of a moved reflector with a laser beam of an essentially stationary source and with direction which is adjustable onto the reflector and is measured and to determine a new position of the reflector by way of a measured direction change and an interferometrically determined distance change. Such measuring methods are for example used for measuring surfaces over which a reflector is moved or to control objects on which a reflector is arranged. There are also known suitable absolute measuring methods. The movements measurable with the known methods are limited in that the reflector usually has a limited front surface onto which the laser beam must fall so that a reflection is ensured. This not only means that no obstacle must be located between laser and reflector but also that the front surface of the reflector must always face towards the laser.

For determining in addition to the position of the reflector or the object on which the reflector is arranged the spacial orientation of the reflector or object, according to the state of the art further reflectors or light points are arranged on the object or on a suitably applied tool and with e.g. a digital camera whose optical axis is adapted to the laser beam direction, the arrangement of the illuminated reflectors or light points is imaged. From a comparison of the effective arrangement of the reflectors or light points and the registered image of this arrangement, parameters of the spacial orientation of the object (e.g. rotational position with respect to orthogonal axes) are computed.

For carrying out the above mentioned methods measuring systems with an instrument such as a laser-tracker, and with a reflector are used, wherein the measuring system where appropriate may also comprise an image recording apparatus and an arrangement of further reflectors or light points. Such an arrangement is for example described in the publication WO 97/14015 (Metronor).

The essential components of the laser-tracker are a laser for producing a light beam, an adjustable mirror means for directing the laser beam onto the reflector and for following a moved reflector, and an interferometer. Reflectors cooperating with laser-trackers are usually retroreflecting triple prisms (a prism with die-corner-like tip and for example a round base or front surface which is perpendicular to the axis of symmetry or optical axis of the prism) or where appropriate triple mirrors (consisting of three mirrors arranged at right angles, which form a hollow die corner). Such reflectors reflect an incident parallel beam bundle on itself and specifically independently of the angle of incidence.

It is known that in contrast to triple mirrors in a triple prism the path of a reflected beam is dependent on its angle of incidence into the prism. Therefore, for a triple prism not only the path length important for the interferometrical measurement but also the path course important for the angular measurement is dependent on the angle of incidence. Because the triple mirror for mechanical reasons must be relatively large and because it is easily contaminated the triple prism usually is preferred inspite of the mentioned disadvantages, and measuring errors caused by the above mentioned dependencies on the angle of incidence are avoided in that the angle of incidence of the laser beam onto the base surface of the triple prism is limited to a range of maximal approx. 20° to the perpendicular. In this range the mentioned dependencies of the measuring result can usually be neglected. Such a limitation of the angle of incidence is for example realized in that the front surface of the triple prism is arranged sunk in a manner such that a beam with a larger angle of incidence does not impinge the front surface.

The mentioned limitation of the angle of incidence makes the measuring conditions mentioned further above more acute since the laser beam must not only fall onto the front surface of the reflector, but it must fall onto this front surface within a quite restricted angular range.

In order to eliminate such limitations in particular for interferometric distance measuring, the publication U.S. Pat. No. 4,707,129 suggests to attach the reflector to the moved object not rigidly but actively pivotable about two axes perpendicular to one another and to align it for the measurement with the laser beam produced by the tracker such that the laser beam falls into the reflector parallel to the reflector axis. For controlling the reflector alignment it is suggested to configure the tip of the triple mirror used as a reflector such that a laser beam specifically produced for this purpose and directed onto this tip region is not reflected but passes through the reflector and impinges onto a position detector (e.g. PSD position sensitive diode) arranged behind the reflector.

In a system equipped in such a manner the above mentioned restrictions are not valid. However, it cannot be used for determining the spacial orientation of an object and it entails a considerable expense with regard to apparatus and control technology.

It is the object of the invention to provide a method and a device for determining the position and orientation of objects, in particular of moved or movable objects with the help of an essentially stationary laser-tracker and of a reflector arranged on the object. The method and the device are to be simple, are to be able to be applied in the most varied of applications and are to alleviate as much as possible the above mentioned restrictions of known such determination methods.

This object is achieved by the method and the arrangement as defined in the corresponding independent claims.

The method according to the invention is based on a reflector having relative to the object on which it is arranged a non-adjustable (i.e. fixed) and known position and orientation or an adjustable orientation and where appropriate an adjustable position, in such a manner that from determination of the reflector position and orientation not only the object position but also the object orientation can be deduced. The method substantially comprises measuring the direction of the laser beam and measuring by interferometry the path length of the laser beam and in addition measuring the angle of incidence of the laser beam into the reflector (orientation of the reflector relative to the laser beam) and/or the reflector orientation relative to the object and using this measurement data together with the measurement data for the laser beam direction and length for computing the sought spacial position and orientation of the object.

For determining the object orientation there are essentially the three following embodiments:

The reflector is arranged on the object, having a fixed, non-adjustable orientation relative to the object; the angle of incidence of the laser beam into the reflector changes and is determined; for computing the object orientation the determined angle of incidence is used in addition to the measured direction of the laser beam.

The reflector is arranged on the object with an adjustable orientation relative to the object and its orientation is determined; the angle of incidence of the laser beam into the reflector changes and is determined also; for computing the object orientation the determined reflector orientation and angle of incidence are used in addition to the determined direction of the laser beam.

The reflector is arranged on the object with an adjustable orientation relative to the object and via a suitable control loop this reflector orientation is automatically adjusted such that the laser beam always falls into the reflector perpendicular to the front surface (angle of incidence is equal to 0°); the reflector orientation is determined; for computing the object orientation the determined reflector orientation is used in addition to the determined direction of the laser beam.

When using a triple prism as a reflector, die measurement data resulting from the determination of the angle of incidence is advantageously used also for correspondingly correcting the interferometric distance measurements and/or the angular measurements for determining the laser beam direction.

The arrangement for carrying out the method according to the invention comprises a laser-tracker with means for measuring the path length of the laser beam (interferometer), a reflector arranged on the object and having a fixed and known position relative to the object, a computer unit and means for transmitting measurement data from the laser-tracker to the computer unit. The reflector is arranged on the object in a manner such that its orientation relative to the object is either fixed and known or adjustable and determinable. The arrangement further comprises means for determining the reflector orientation relative to an incident laser beam (angle of incidence) and/or means for determining the reflector orientation relative to the object as well as means for transferring the corresponding measurement data to the computer unit.

For measuring the angle of incidence, a triple prism used as a reflector comprises instead of a tip a pass-through surface which is aligned essentially parallel to the base surface, i.e. perpendicular to the optical axis and through which a central part of a laser beam falling into the reflector passes the prism unreflected. A triple mirror used as a reflector comprises at its tip a suitable opening. Behind the reflector, a position sensor is arranged in a manner such that the beam part penetrating through the reflector impinges thereon. The position of the light spot detected by the sensor is directly dependent on the angle of incidence of the laser beam into the reflector. The position sensor is for example arranged in a plane perpendicular to the optical axis of the reflector and is for example a position sensitive diode (PSD) or a CCD sensor (charge coupled device) as used in digital cameras.

Detection of the beam part passing through the reflector with the position sensor allows determination of reflector rotation about two axes perpendicular to its optical axis. Rotation about the reflector axis cannot be determined.

A reflector having an adjustable orientation relative to the object is arranged on the object being rotatable about two axes (parallel to its front surface), as e.g. described in publication U.S. Pat. No. 4,707,129 cited further above. For determining the reflector orientation there are e.g. angle sensors provided in a per se known manner.

The method according to the invention and advantageous embodiments of the device for carrying out the inventive method are described in detail by way of the following Figures, wherein:

FIG. 3: viewed parallel to the optical axis of the reflector);

Figure 1:
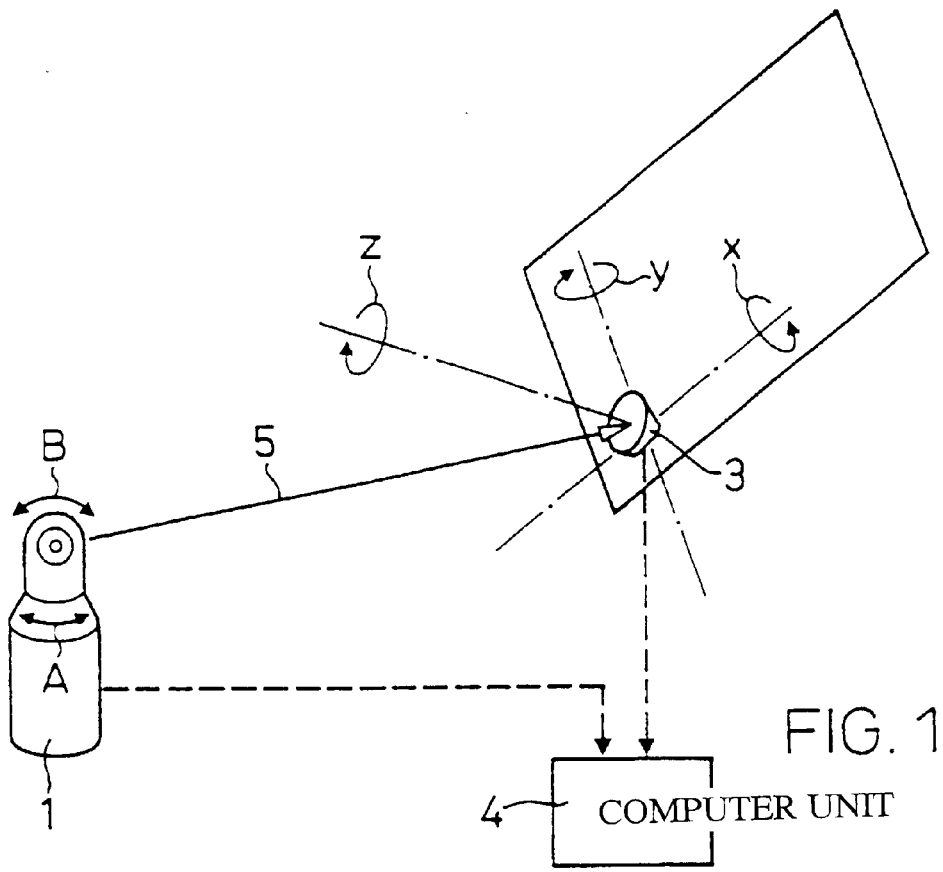
FIG. 1 shows schematically an arrangement according to the invention for illustrating the method according to the invention.

FIG. 1 shows very schematically an arrangement for carrying out die method according to the invention. This arrangement comprises a laser-tracker 1, a reflector 3 arranged on an object 2 and a computer unit 4. The laser-tracker emits a laser beam 5 in an adjustable direction (double arrows A and B) and is equipped for angle measurement in order to determine the direction of the laser beam 5 and for interferometric length measurement for determining the path length of the laser beam 5 from the tracker 1 to the reflector 3 and back, which path length essentially corresponds to the distance or distance change between the tracker 1 and the reflector 3.

The reflector 3 is a triple prism or triple mirror with a position and orientation relative to the object, which is fixed and known or adjustable and determinable by measurement.

It is evident from FIG. 1 that using the direction and distance measurement of the laser-tracker only the position of the reflector, i.e. the position of a single point of the object can be determined, and that for determining its spacial orientation (e.g. rotational positions relative to the axes x, y, z) further measurements are necessary. According to the invention, the orientation of the reflector 3 relative to the laser beam 5 (angle of incidence) and/or the orientation of the reflector 3 relative to the object 2 are measured in addition to the direction of the laser beam 5 and the distance between the tracker and reflector 3.

The measurement data from the laser-tracker and the measurement data from the measurements of the reflector orientation are transmitted to the computer unit 4 and are used for computing the position and orientation of the object 2 and where appropriate also for correcting the measurement data produced by the laser-tracker 1.

Figure 2:
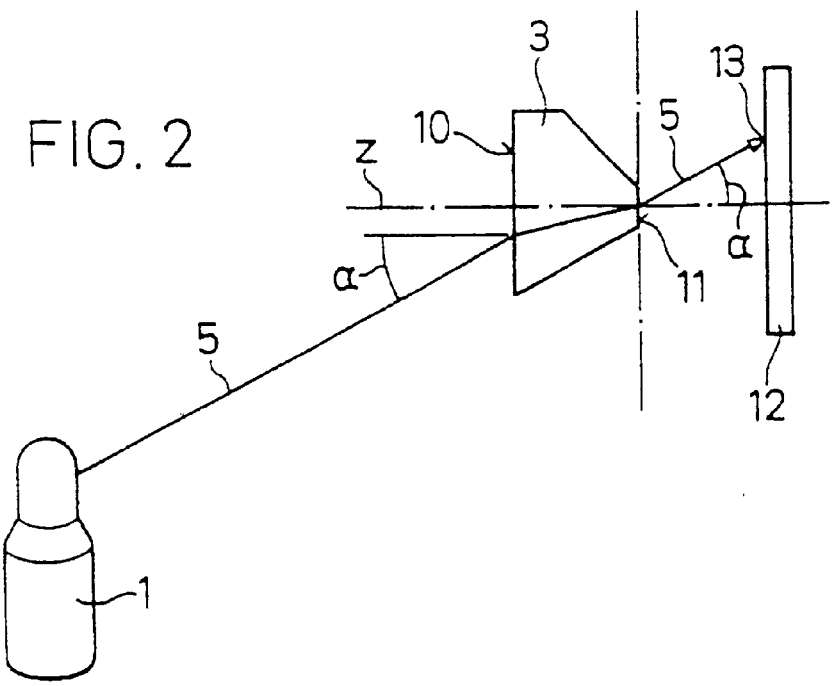
FIGS. 2 and 3 show the principle of the determination of the angle of incidence of a laser beam into a retroreflector (FIG. 2: viewed transverse to the optical axis of the reflector.
Figure 3:
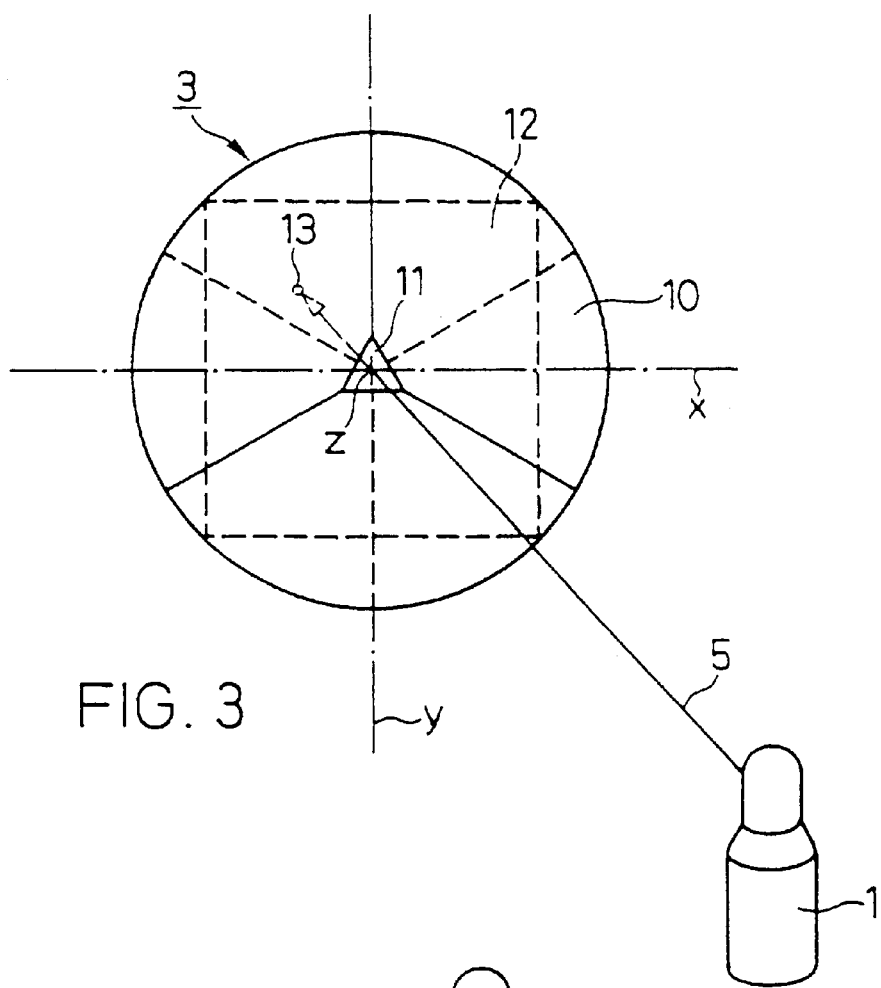

FIGS. 2 and 3 show the principle of the determination of the reflector orientation relative to the laser bean 5 or the angle of incidence α of the laser beam into the reflector. The Figures show a reflector 3, a position detector 12 rigidly connected to the reflector 3 in a not shown manner, and a laser beam 5 of which a part falls through the reflector 3 onto the position detector 12. In FIG. 2, the direction of view is transverse to the optical axis z of the reflector, in FIG. 3 it is parallel to this.

The reflector 3 is for example a triple prism with a round base or front surface 10 and an optical axis z which represents the height line of the prism. Instead of a tip the triple prism comprises a pass-through surface 11 which is parallel to the front surface 10 and which is dimensioned for passage of a central part of the laser beam 5.

The peripheral parts of the laser beam 5 are reflected parallelly in a manner which is not shown. The unreflected central part of the beam exits through the pass-through surface 11 out of the reflector 3 and impinges the position detector 12 which comprises a light-sensitive surface e.g. arranged perpendicular to the optical axis z. The detector 12 produces a measuring signal corresponding to the position of a light spot 13 on this surface. The position of the light spot 13 produced by the part beam 13 corresponds to the angle of incidence α of the light beam onto the front surface 10 of the reflector 3.

Using a laser beam with a diameter in the region of 6 to 8 mm which is usual for such applications, good results are achieved using a pass-through surface 11 (on the triple prism) or pass-through opening (on the triple mirror) having a diameter in the region of 0.3 mm.

FIG. 4 illustrates again in a very schematic manner the one embodiment of the method according to the invention in which the reflector 3 and the position detector 12 are arranged rigidly on the object, that is to say with a non-adjustable orientation relative to the object 2. The position and spacial orientation of the object 2 are computed based on the measurement data of the tracker-internal angular measurements for determining the direction of the laser beam 5 and the measurement data of the interferometer as well as measurement data produced by the position detector 12 arranged behind the reflector 3 (represented by corresponding data lines shown dashed to the computer unit 4). From the laser beam direction and the angle of incidence $\alpha$ it is possible to directly deduce the spacial orientation of the reflector 3 and of the object 2.

Figure 5:
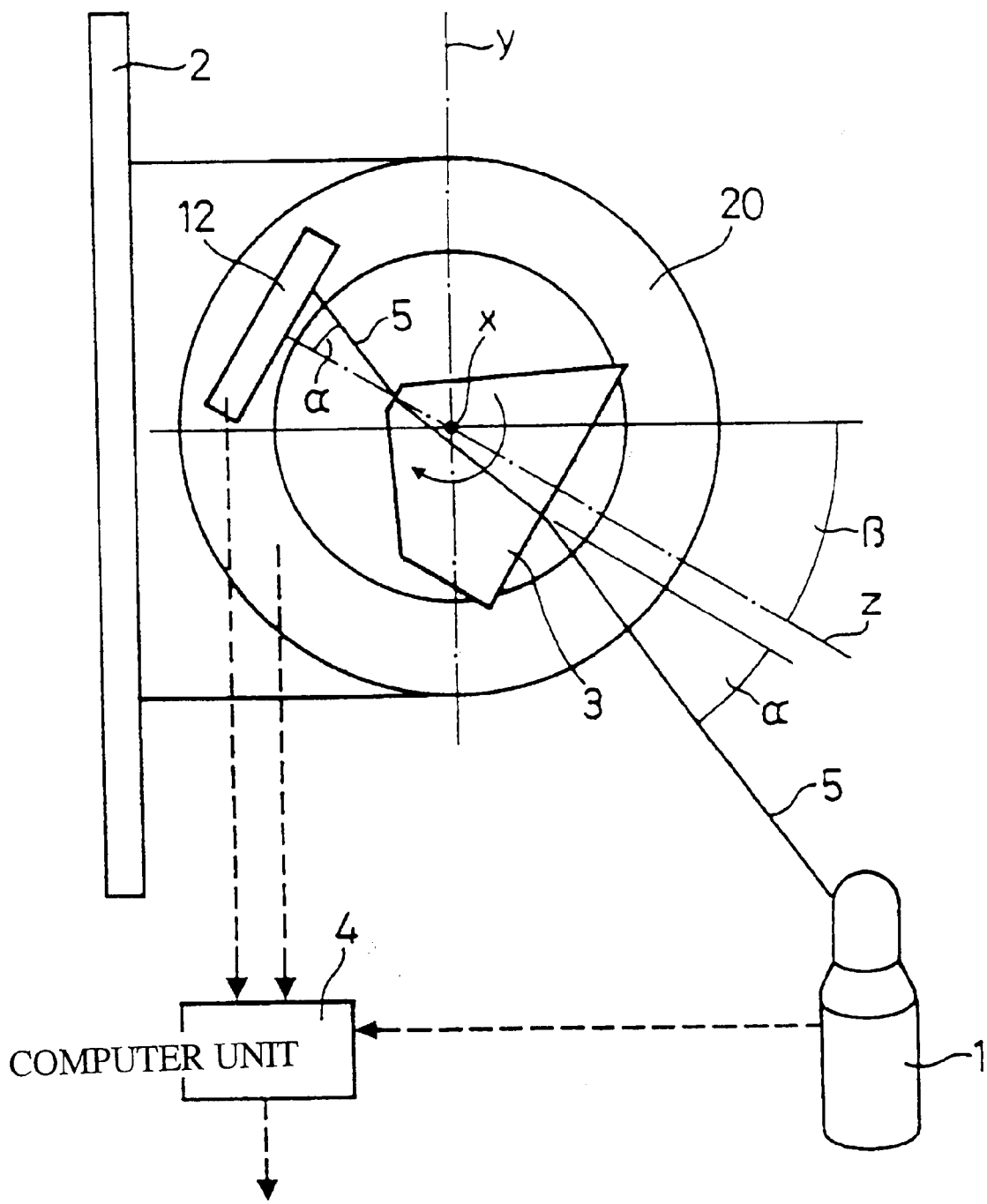

FIG. 5 illustrates the one embodiment of the method according to the invention in which the reflector 3 with the position detector 12 has an orientation relative to the object being adjustable relative to the object 2. They are for example rotatable about at least one axis x perpendicular to the optical axis z of the reflector. The rotational angle $\beta$ about this axis x is determined with the help of an angle transmitter 20. The measurement data produced by the angle transmitter 20 and by the position sensor 12 are transferred to the computer unit 4 for computing the position and orientation of the object 2 (indicated by the dashed data lines).

The rotation about the x-axis may for example be a hand adjustment of the reflector 3 which aligns the reflector 3 roughly with the laser beam 5. The angle relevant for the computation of the spacial orientation of the object is the sum of the angle of incidence $\alpha$ and the orientation angle $\beta$.

In the same manner as shown for the orientation change by rotation of the reflector about the axis x, the reflector 3 can be further adjustable together with the position sensor 12 by rotation about an y-axis at right angles to the x-axis. Thereby, it is advantageous but not compelling for both axes x and y to intersect the z-axis.

Figure 6:
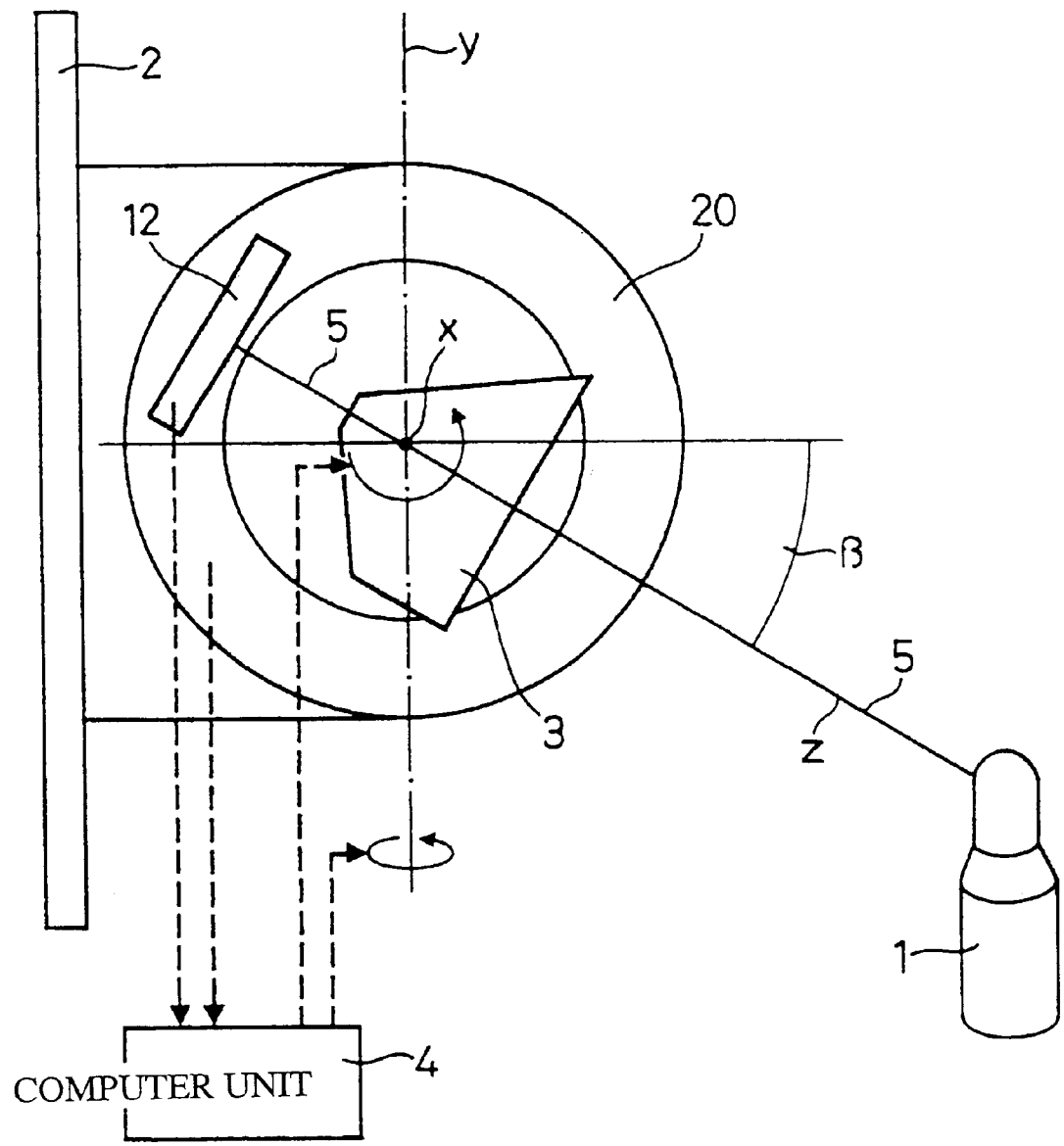

FIG. 6 shows the one embodiment in which the reflector 3 and the position sensor 12 have an adjustable orientation relative to the object 2 by e.g. being rotatable about the axes x and y. For determining the orientation angle $\beta$, suitable angle transmitters 20 (only one is shown) are provided. The adjustment is effected via a control loop which for example is implemented in the computer unit 4 and for which the measuring signal of the position sensor 12 serves as a measuring element and suitable rotation drives which are not shown in the Figure serve as final control elements. The control loop is configured in a manner such that the reflector 3 is always aligned for the laser beam to run along the optical axis z of the reflector 3. For computing the position and orientation of the object 2, measurement data produced by the angle transmitters 20 with respect to the reflector orientation is used in addition to the measurement data regarding the direction and path length of the laser beam 5 (represented by corresponding data lines to the computer unit 4).

Figure 4:
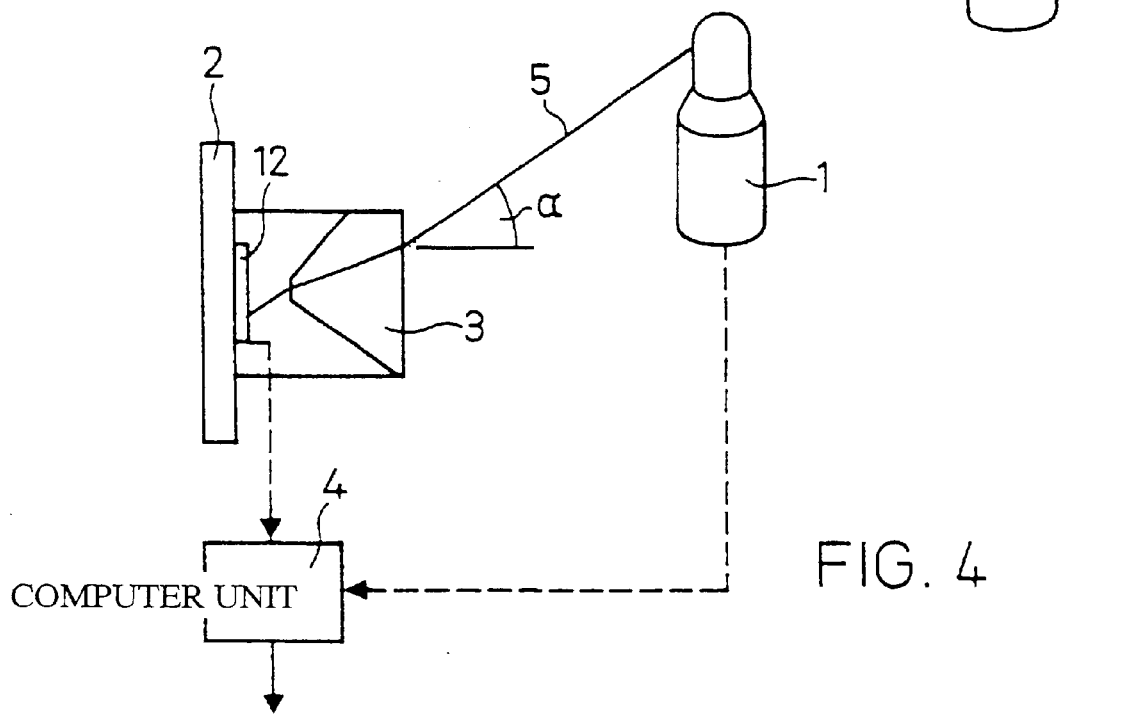
FIGS. 4 to 6 show schemes of three embodiments of the device according to the invention for carrying out the three above mentioned embodiments of the method according to the invention.

It is also possible to use mixed forms of the embodiments of the method according to the invention shown in FIGS. 4 to 6.

For correcting the interferometric measurement and the angular measurement regarding laser beam direction using the angle of incidence $\alpha$ of the laser beam into the reflector which is measured in the method according to the invention, suitable results of calibration measurements or theoretically worked out correction functions are made available to the computer unit 4. The dependency of the measuring results on the angle of incidence $\alpha$ is caused by the higher optical density of the triple prism and by the related refraction of the laser beam on entering the prism and on exiting. For the interferometric measurement there results essentially an additive correction factor, for the angular measurement a distance-independent collection laterally to the laser beam.

Even though the method according to the invention is in particular advantageous for determining the position and orientation of objects, it of course may also be used for determining the position of points, wherein then the measurement data of the position detector is used only for correcting the interferometric measurement and the angle measurement regarding laser beam direction.

What is claimed is:

1. A method for determining a position and a spatial orientation of an object, in particular of a moving object, the method comprising the steps of:

mounting a reflector on the object, the reflector being able to reflect an incident laser beam parallelly independently of an angle of incidence;

pointing a laser beam from an essentially stationary source to the reflector and following the reflector with the laser beam during movement of the object by automatically changing the direction of the laser beam;

acquiring data defining the path length of the laser beam, the direction of the laser beam and the angle of incidence of the laser beam onto the reflector;

and calculating the position and the spatial orientation of the object from the acquired data and from data defining an orientation of the reflector relative to the object.

2. The method according to claim 1, characterized in that the data with respect to the angle of incidence of the laser beam onto the reflector is produced by a position sensor, said position sensor being stationarily arranged relative to the reflector in a manner such that an unreflected central part of the laser beam passes through a pass-through surface or passes through an opening of the reflector and impinges onto the position sensor and thereupon produces an image the position of which is correlated to the angle of incidence.

3. The method according to claim 1, characterized in that the reflector is stationarily arranged relative to the object.

4. The method according to claim 1, characterized in that the reflector has an adjustable orientation relative to the object and that data with respect to the orientation of the rejector relative to the object orientation are measured.

5. The method according to claim 4, characterized in that the reflector is arranged rotatable relative to the object about at least one axis perpendicular to its optical axis, and that data with respect to the reflector orientation relative to the object is produced by measuring at least one rotational angle of the reflector about said at least one axis.

6. The method according to claim 4, characterized in that the reflector is coarsely aligned with the laser beam by adjusting its orientation relative to the object, and that the position and spatial orientation of the object are computed by way of measurement data with respect to the direction and the path length of the laser beam and by way of the additional measurement data with respect to the angle of incidence as well as with respect to the reflector orientation relative to the object.

7. The method according to claim 1, characterized in that the measurement data with respect to the path length of the laser beam is produced by interferometry and that the measurement data with respect to the direction of the laser beam is produced by angle measurement.

8. The method according to claim 1, characterized in that measuring errors caused by a dependency of the path length or the direction of the laser beam on the angle of incidence are corrected using the measured data with respect to the angle of incidence.

9. The method according to claim 2, characterized in that the reflector is stationarily arranged relative to the object.

10. The method according to claim 2, characterized in that the reflector has an adjustable orientation relative to the object and that data with respect to the orientation of the reflector relative to the object orientation are measured.

11. The method according to claim 10, characterized in that the reflector is coarsely aligned with the laser beam by adjusting its orientation relative to the object and that the position and spatial orientation of the object is computed by way of measurement data with respect to the direction and the path length of the laser beam and by way of the additional measurement data with respect to the angle of incidence as well as with respect to the reflector orientation relative to the object.

12. An apparatus for determining a position and spatial orientation of an object, in particular of a moving object, the apparatus comprising:

a reflector mounted on the object and being able to reflect an incident laser beam in parallel to itself independently of an angle of incidence;

a substantially stationary laser tracker comprising a laser, means for pointing the laser beam produced by the laser to the reflector and following the reflector during movement of the object by automatically changing the direction of the laser beam and further comprising means for acquiring data defining a path length and a direction of the laser beam pointed to and reflected by the reflector;

means for acquiring data regarding the angle of incidence of the laser beam at the reflector;

and means for calculating the position and the spatial orientation of the object from the acquired data and data defining the orientation of the reflector.

13. The apparatus of claim 12, characterized in that the reflector is arranged with a non-adjustable orientation relative to the object.

14. The apparatus of claim 12, characterized in that the reflector is arranged with an adjustable orientation relative to the object and that the arrangement additionally comprises means for producing additional measurement data with respect to the adjustable orientation of the reflector relative to the object, and means for computing the position and spatial orientation of the object by way of the measurement data with respect to the laser beam and by way of the additional measurement data.

15. The apparatus of claim 12, characterized in that the reflector is a triple prism with a pass-through surface or a triple mirror with a pass-through opening and that for measuring the angle of incidence and for producing corresponding measurement data, a position detector arranged stationarily relative the the reflector is provided.

16. The apparatus of claim 15, characterized in that for measuring the reflector orientation relative to the object and for producing corresponding measurement data, angle transmitters are provided.

17. The apparatus of claim 12, characterized in that it further comprises means for correcting the measurement data with respect to the direction of the laser bean or the path length of the laser beam by way of measurement data with respect to the angle of incidence of the laser beam into the reflector.

18. The apparatus of claim 15, characterized in that for measuring the reflector orientation relative to the object and for producing corresponding measurement data, angle transmitters are provided.

* * * * *

UNITED STATES PATENT AND TRADEMARK OFFICE
CERTIFICATE OF CORRECTION

| | |
|---|---|
| PATENT NO. | : 6,667,798 B1 |
| APPLICATION NO. | : 10/048304 |
| DATED | : December 23, 2003 |
| INVENTOR(S) | : Markendorf et al. |

It is certified that error appears in the above-identified patent and that said Letters Patent is hereby corrected as shown below:

On the Title page,

Item [74], "Oppendahl" should read -- Oppedahl --

Signed and Sealed this

Eighteenth Day of May, 2010

David J. Kappos
*Director of the United States Patent and Trademark Office*